United States Patent [19]

Shapiro

[11] Patent Number: 5,514,397
[45] Date of Patent: May 7, 1996

[54] PROCESS FOR MAKING A LAYERED DOUGH SHEET PRODUCT

[75] Inventor: Lorenzo A. Shapiro, Denver, Colo.

[73] Assignee: Holy Ravioli Pasta Company, Englewood, Colo.

[21] Appl. No.: 196,589

[22] Filed: Feb. 15, 1994

Related U.S. Application Data

[63] Continuation-in-part of Ser. No. 861,418, Apr. 2, 1992, abandoned.

[51] Int. Cl.$^6$ .................. A21D 2/00; A23L 1/16
[52] U.S. Cl. .......... 426/249; 426/272; 426/275; 426/502; 426/503; 426/517; 426/557
[58] Field of Search .............. 426/94, 249, 557, 426/451, 104, 272, 502, 503, 512, 517, 275

[56] References Cited

U.S. PATENT DOCUMENTS

| | | |
|---|---|---|
| 3,372,654 | 3/1968 | Bell . |
| 4,244,974 | 1/1981 | Minami et al. .............. 426/502 |
| 5,114,724 | 5/1992 | Bottero . |

OTHER PUBLICATIONS

Japanese Patent Abstract 90.09.04 Sec. c, Section No. 754; vol. 14, No. 406, p. 127.
"Cookies for Kids", *Homes and Gardens*, 1983.
"Nice and Easy Christmas Ideas", *Family Circle*, Dec. 23, 1986.
"The Cookie Book", by Eva Moore, 1973.
"100 Cookies for Christmas", *Good Housekeeping*, p. 56, Dec. 1983.
"Miniature Desserts", Pam Dotter, 1986.
"Dessert", The Family Cookbook, p. 100, 1972.
"Sugar Work, Blown-and Pulled-Sugar Techniques", P. Boyle, 1988.
"Great Little Sweet Treats, Crafts from your Kitchen," Vanessa-Ann, 1992.
"Pasta Book", J. McNair's, 1990.
"Many Times, Many Ways Merry Christmas to You", *Family Circle*, Dec. 6, 1983.
"Betty Crocker's Cookbook", Golden Press/New York, 6th Printing, 1981.
"Cookie Cookery", Zenker and Hazel G. Zenker, 1969.
"Rodales Sensational Desserts", J. Bingham & D. Riccio, 1985.
APV Baker "UNEX" and DUALEX Extruders.

*Primary Examiner*—Arthur L. Corbin
*Attorney, Agent, or Firm*—Timothy J. Martin

[57] ABSTRACT

A process for making dough products having alternating bands with different characteristics, such as color, flavor or composition, includes several processing steps. First, a plurality of dough masses are formed into dough sheets of an initial thickness with each dough sheet having a selected characteristic. The dough sheets are layered on top of one another into a composite sheet having outer exposed surfaces. The composite sheet is cut through its thickness into a plurality of elongated strips, and these strips are laid on their sides with the uncut surfaces of the strips, as defined by the former exposed surfaces of the composite sheet, being placed in contact with one another to form an ensemble sheet. The ensemble sheet is then compressed to reduce the ensemble sheet thickness and to Join the strips to produce a production sheet. Roll forming may be used to produce the production sheet. The uncut surfaces of the strips may be coated with a material to increase their adherence to one another. The production sheet may be cut into an uncooked food piece of a selected shape which may then be cooked. An enclosure may be formed out of a pair of panels, at least one of which is formed from the production sheet, and the interior of the enclosure may be filled with a food filling. Products according to this process are also described.

29 Claims, 6 Drawing Sheets

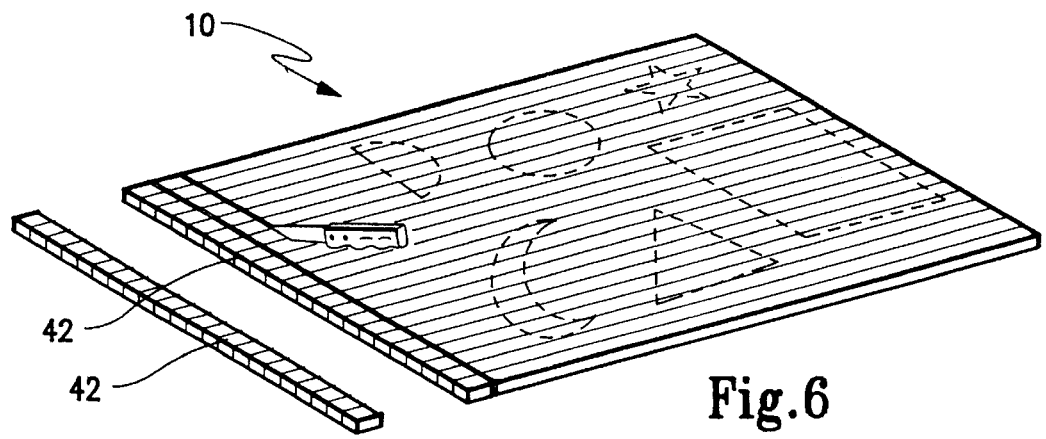
Fig.6
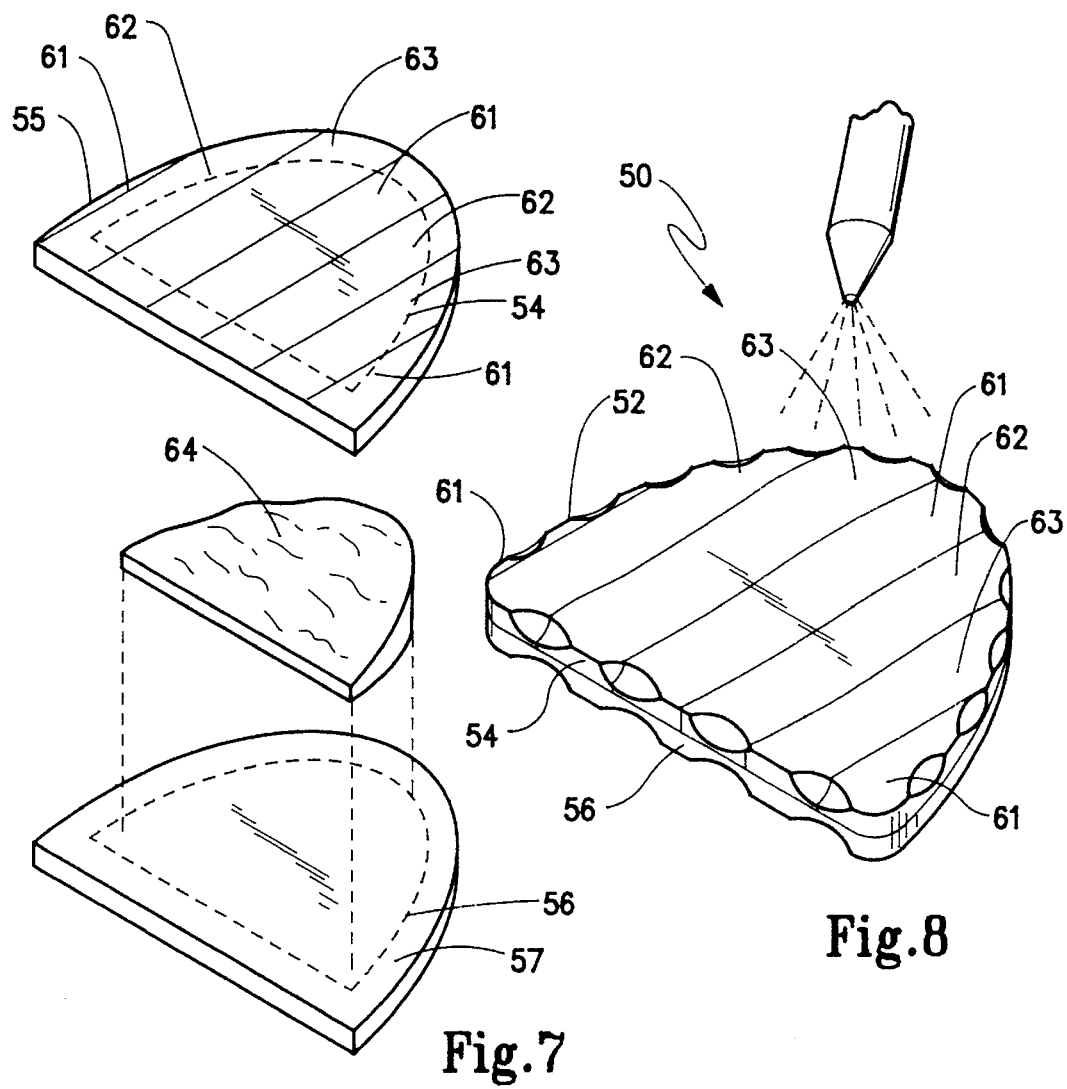
Fig.7
Fig.8

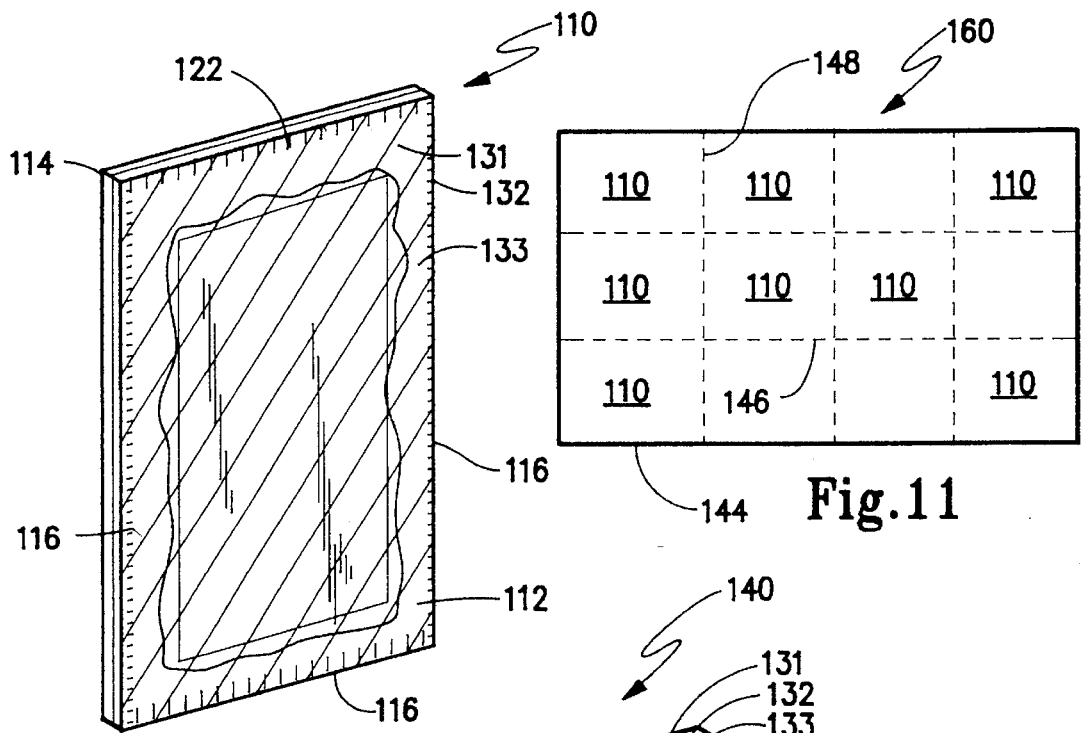
Fig.9
Fig.11
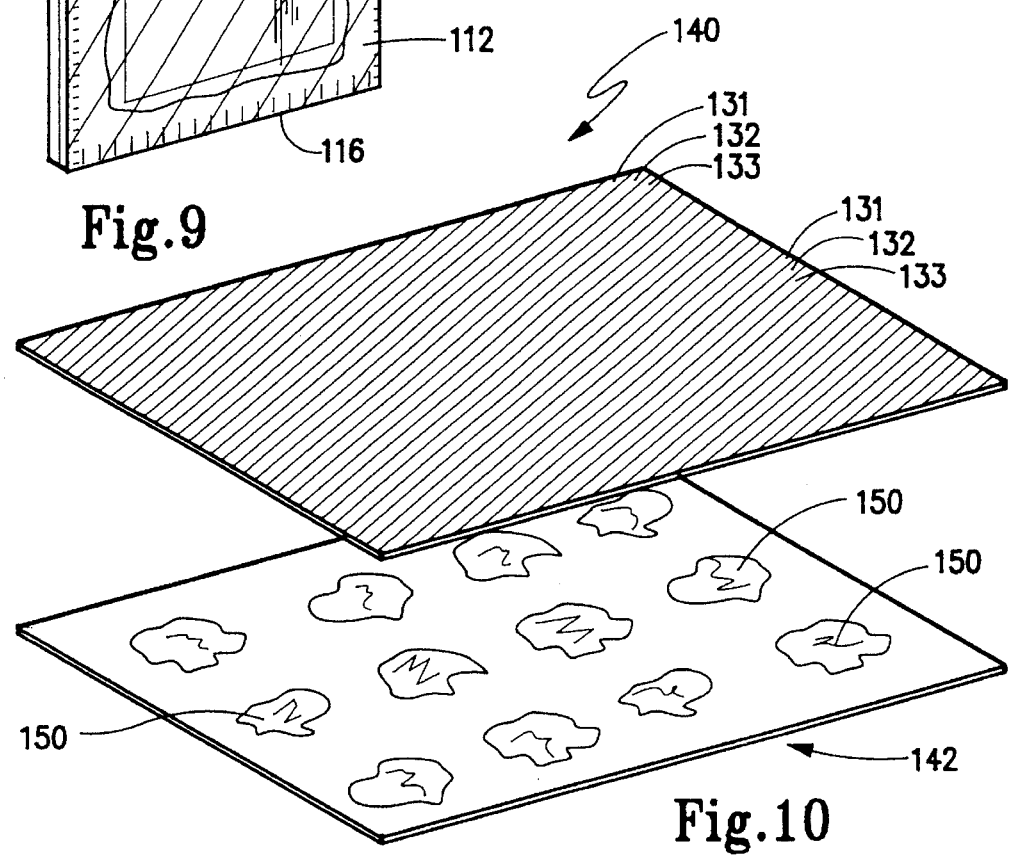
Fig.10
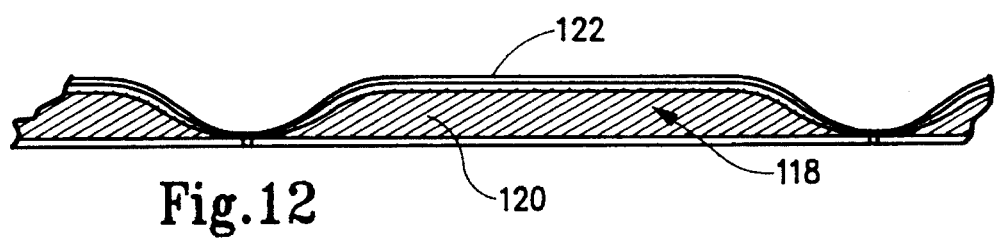
Fig.12

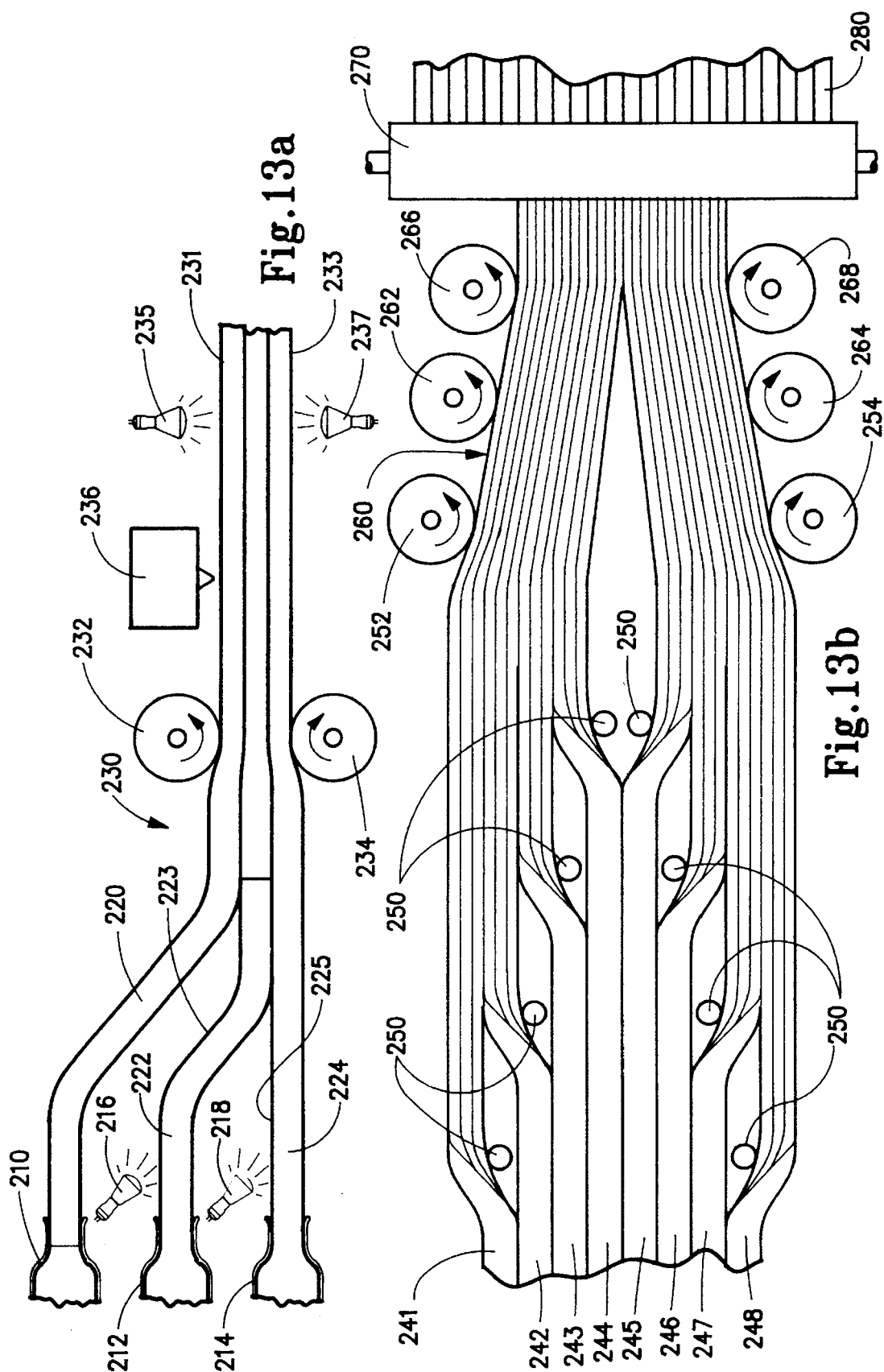

PROCESS FOR MAKING A LAYERED DOUGH SHEET PRODUCT

This application is a continuation-in-part of my earlier application, Ser. No. 861,418, filed on Apr. 2, 1992 and entitled PROCESS FOR MAKING MULTI-COLORED PASTAS AND PASTA PRODUCTS, now abandoned.

FIELD OF THE INVENTION

The present invention relates to the production of multi-banded food products out of various doughs wherein at least a portion of the food product is multi-banded with bands of different characteristics such as color, flavor and composition. Accordingly, the present invention concerns manufacturing processes used to constitute such food products, including filled food products, and the production of sheets of dough out of which such products might be made.

BACKGROUND OF THE INVENTION

The acquisition, preparation and consumption of food may be thought of as a dominant force of human activity. As modern cultures have developed, the preparation of foods having a variety of pleasing tastes and aesthetic presentations have enhanced the culinary art. Indeed, a plethora of different food products are available for food purchase by different consumers. Many of such food items are fully prepared and/or ready for immediate consumption, such as for example, bakery products, some fruits, snack items, etc. Some food items are fully cooked but require reheating such as, canned vegetables, canned meats, some bakery products and the like. Other food items may be substantially prepared but do need to be cooked by the consumer. With literally thousands of fully prepared or partially prepared food items being offered for sale in food stores, food processing companies are constantly seeking advantages to entice the consumer to purchase their particular food product or food products. One advantage being sought by food processing companies includes improving the physical appearance of the product.

A pasta product known as spaghetti may be used to illustrate how a food processing company may promote its own food product in favor over a competitor's product. Here, for example, one food processing company packages a spaghetti product having three differently colored spaghetti noodles. One noodle is green, the other is red, and the other is the standard pale-yellow color of traditional pasta. Here, the green colored spaghetti is made by adding a spinach powered to a typical pasta dough before it is formed into the spaghetti noodles; in the red colored spaghetti noodle, tomato powder may be added. Displaying the assembly of three differently colored noodles in a transparent bag affords visual appeal to the consumer. When cooked, a tantalizing aroma arouses the olfactory senses and the multi-colored pasta provides a visually pleasing presentation when set before a diner. Moreover, the different flavors of the multi-colored pasta can be tasteful and, where vegetables are used to generate color, additional nutritional value is imparted to this spaghetti. A nutrition conscience consumer may be enticed to purchase a multi-colored pasta product not only because of its aesthetics and flavor but also because of the supplement nutritional value that may be contained therein.

In contrast to the packaging of individually colored spaghettis, it is known to laminate pasta noodles to have different colors. An example of this is described in Japanese patent disclosure 90-227,327/30 to Watanabe filed Dec. 6, 1988 and published as J.P. 309,090 on Jun. 14, 1990. In this disclosure, sheets of noodle dough are laminated with one another with a binding agent after which the laminated noodles may be further rolled and cut into noodle-like strips so that each strip has a layer of color which extends completely through the noodle. While this technique may be suitable for forming noodles with multi-bands of color, the Watanabe disclosure does not show a process or production sheet wherein wide bands of color may be used for other pasta products, snack items, pastries and the like.

Accordingly, a need remains for a process that can more efficiently and effectively produce production sheets of formed dough wherein the production sheet has bands of different characteristics extending therethrough whereby the production sheet may be cut and cooked into food items or further processed to create food items that are visually pleasing and tasty to the consumer. Moreover, a need exists for such a production sheet, a method for producing such sheet and final food products made therefrom which can be implemented in automated food processing technology. The present invention is directed to such processes and food products.

SUMMARY OF THE INVENTION

It is an object of the present invention to provide a new and useful process for creating multi-banded sheets of dough and food products made therefrom.

A further object of the present invention is to provide a process for creating multi-banded sheets of dough and food products made therefrom wherein a plurality of bands of different composition are found in the dough and food product, with such multi-bands being different bands of color, taste or composition.

Another object of the present invention is to provide for a variety of food products which are produced from multi-banded production sheets, and which may be either flat or filled products and having almost any desired geometry.

Still a further object of the present invention is to provide for production sheets used to produce food products wherein the production sheets may be constituted from a variety of dough-forming grains or other food materials.

Yet another object of the present invention is to provide for a method of producing multi-banded production sheets of dough which may be easily automated by production equipment.

According to the present invention, then, a broad process for composing a production sheet of dough is described wherein this dough may be used to produce a multi-banded food product. In the broad method, a plurality of initial dough masses are provided with some dough masses having different characteristics and each being of sufficient consistency to be formed into sheets.

Next, these dough masses are formed respectively into a plurality of initial dough sheets which have a selected initial thickness. The process then includes the step of layering the plurality of initial dough sheets, one on top of another, to form a composite sheet having a composite thickness which is the sum of the initial thicknesses of the initial dough sheets and which has outer opposite surfaces defined by the exposed surfaces of outermost ones of the initial dough sheets. If desired, a paste or a water spray may be employed to help adhere the initial sheets with one another into the composite sheet. The composite sheet is next cut into a plurality of elongated strips which each have cut surfaces of a width across to the composite thickness and which have uncut surfaces which are defined by a portion of the outer opposite surfaces of the composite sheet. A plurality of such elongated strips are then arranged into an ensemble wherein the uncut surfaces of adjacent ones of the elongated strips are placed in contact with one another and so that ribbons of each of the initial sheets extend between the top and bottom surfaces of the ensemble wherein the top and bottom surfaces are formed by the cut surfaces of the elongated strips. The ensemble is then compressed by reducing the ensemble thickness so that the elongated strips become joined to one another to form a production sheet which has a plurality of bands of dough extending completely therethrough with the bands having different characteristics as defined by the ribbon characteristics of the respective ribbons.

In producing the production sheet described above, the initial doughs may be selected to have different colorings, different flavorings and/or different compositions. For example, the flavorings could be sweeteners, vegetable flavorings and spices. Moreover, the initial dough masses may be made from a grain flour, such as wheat flour, corn flour, oat flour, rye flour, rice flour or a combination of any of the above.

The initial dough sheets may be formed by either the same thickness or different thicknesses so that the ultimate bands produced for the production sheet may have similar or different widths. When cutting the elongated strips, they are preferably cut at strip widths at approximately ½ inch (1.25 cm) so that the resulting ensemble thickness has a thickness of approximately ½ inch (1.25 cm). This ensemble is then preferably roll-formed into the final production sheet.

To enhance the joining of the adjacent elongated strips and the assemble, the uncut surfaces of the elongated strips may be coated with a paste material or sprayed with water prior to assembling the ensemble, and this coating may be applied either before or after the composite sheet is cut into the respective elongated strips. Likewise, a binding material such as water or paste may be applied to the contacting surfaces of the initial sheets to increase their adherence as the composite sheet. Here, also the composite sheet may be compressed before the elongated strips are cut. Moreover, after forming the ensemble sheet, it can be transversely compressed before compressing it to reduce the ensemble sheet thickness.

In any event, the production sheet described above may be either cut into a food item or further processed. For example, the production sheet itself may be cut into a final shape of some selected geometry, including animal forms. These may then be cooked or otherwise completed into a final food product, such as a cookie, snack item, noodle, etc. Either the production sheet or a geometric shape cut therefrom can be further processed by joining it with a similar production sheet (or cut piece) or a plain dough sheet to form an enclosure that has an interior which receives a filling. Such fillings could be meat, pudding, fruit preserves, jelly, jam, chocolate, cheese, etc., and the enclosure is formed by joining a peripheral margin of the superimposed sheets together. This processing would be useful for producing ravioli, cannellonis, toaster pastries and the like. Where a pastry product is produced, it may be iced with a clear glazing so as to permit a consumer to still appreciate the visual appearance of the multi-banding despite the presence of the glazing. Preferably, in the formation of a filled food product, a matrix of discrete filling masses are positioned on a sheet of dough, either the production sheet or the auxiliary sheet, and the other such sheet is superimposed over the matrix. The two sheets are then joined in the region between the filling masses by crimping or other techniques so that a plurality of enclosures are formed with joined regions extending around each of the filling masses. The joined sheets are then separated at the joined regions to create a plurality of individual units of the filled product.

From the foregoing, it should be appreciated that the present invention includes the production sheet as described above, the process for making the production sheet, the final food products described and the processes for making the same.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 6 is a perspective view of the production sheet of FIG. 1 being cut into noodle-like food pieces or other geometric food shapes;

FIG. 7 is an exploded view in perspective showing the production of an exemplary filled food product according to the present invention;

FIG. 8 is a perspective view of a finished filled food product of FIG. 7 shown being coated by a clear glazing layer;

FIG. 9 is a perspective view of a toaster pastry as an exemplary embodiment of a filled food product according to the present invention;

FIG. 10 is an exploded view in perspective showing a preferred method of producing a plurality of the toaster pastries of FIG. 9;

FIG. 11 is a top plan view of the assembled product shown in FIG. 10;

FIG. 12 is a cross-sectional view taken about lines 12—12 of FIG. 11; and

FIGS. 13(a), 13(b) and 13(c) are a diagrammatic view of a representative automated process according to the present invention.

DETAILED DESCRIPTION OF THE EXEMPLARY EMBODIMENTS

The present invention generally concerns processes for preparing multi-banded production sheets of dough and preparing multi-banded food products made therefrom. It should be appreciated that the variety of food products which are currently known and which are made from such doughs can now be produced from the multi-banded production sheet of dough prepared according to this invention so as to allow creation of various multi-banded products. For example, if the multi-banded production sheet of dough was of a type to produce pasta products, a variety of sizes and shapes of multi-banded pasta can be produced therefrom, including such things as cannelloni, tortellini, manicotti, noodles, ravioli and the like. If the multi-banded production sheet was made from pastry dough, a variety of multi-banded pastry products could be produced. For the multi-banded sheets was cookie dough, multi-banded cookies could be produced. These examples are merely for the sake of illustration, and it should be readily understood by those skilled in the art that such other items such as snack chips, crackers, toaster pastries and a host of others can be produced from the multi-banded production sheets.

Figure 1:
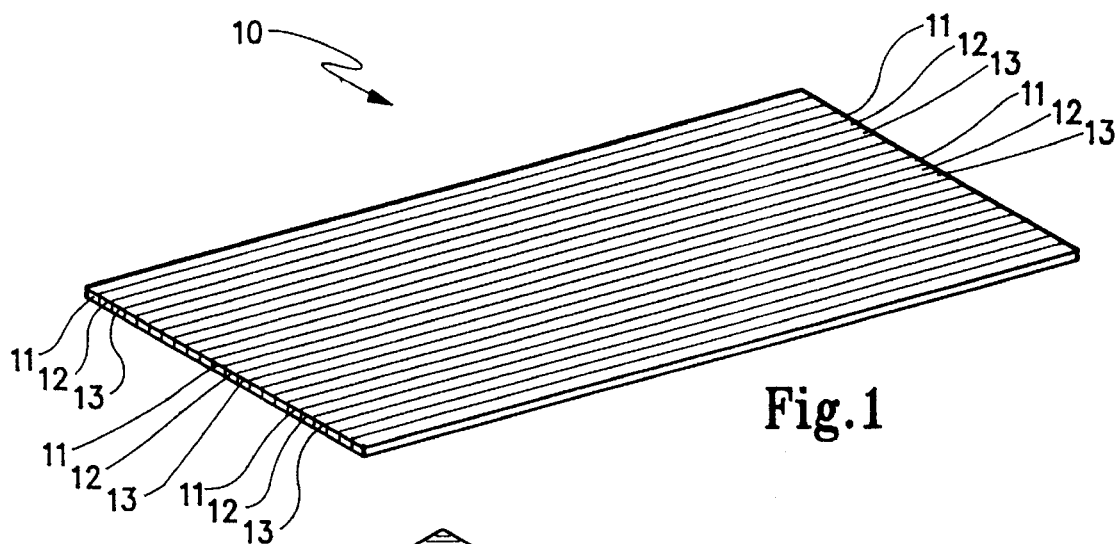
FIG. 1 is a perspective view of an exemplary embodiment of a production sheet manufactured according to the process of the present invention.

With reference to FIG. 1, a representative production sheet 10 is illustrated and is shown to have a plurality of longitudinally extending bands 11, 12 and 13 which are repetitive across the transverse width of production sheet 10. Bands 11, 12 and 13 have different physical characteristics, such as being of a different color, flavor, composition or a combination thereof. For example, band 11 can be red, band 12 white and band 13 blue merely for visual appearance. Alternatively, band 11 could be vanilla flavored, band 12 chocolate flavored and band 13 strawberry flavored. Where different compositions are desired, band 11 could be a white flour dough, band 12 a wheat flour dough and band 13 a rye flour dough. Thus, it should be understood that production sheet 10 can be made from a variety of doughs such as wheat, corn, rye, oats, rice, etc., and could even be a vegetable dough (e.g., potato and legume) or other doughs as is known in the art. By using a cornmeal dough, for example, multi-banded corn tortilla chips could be produced. Here, blue cornmeal and yellow cornmeal could be used to produce an aesthetically pleasing chip. Accordingly, though this invention is described with respect to certain exemplary embodiments, it is not to be limited in scope to just the embodiments so described.

Figure 2:
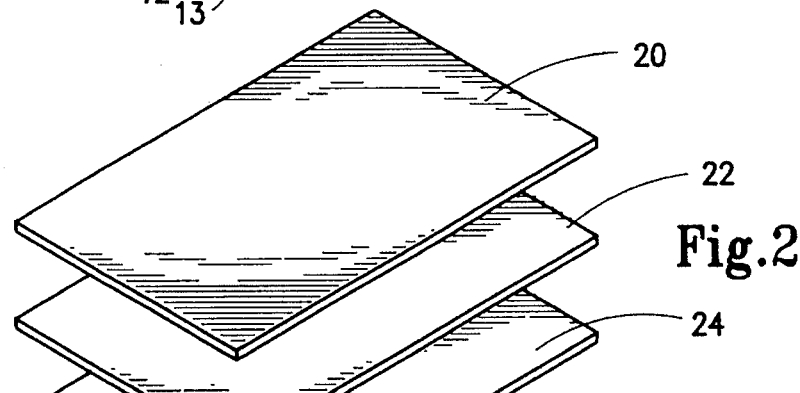
FIG. 2 is a perspective view of three initial sheets used to produce the production sheet of FIG. 1.

In order to produce production sheet 10, several processing steps are involved, as will now be described. With reference to FIG. 2, then, it may be seen that three initial sheets 12, 22 and 24 of doughs of different characteristics are superimposed or layered, one on top of the other to produce a composite sheet 30, shown in FIG. 3. It should be understood that the process of forming the ultimate production sheet requires that initial dough masses be first provided and used to produce initial sheets 20, 22 and 24. Here, initial dough masses are made with a desired recipe, such as typical recipes known in the art. It is important, however, that these be doughs which have the consistency to be sheeted, for example, by rolling or extruding into flat sheets. At least some of the doughs have the different desired physical characteristics, and these dough masses are then formed into the initial dough sheets 20, 22 and 24. Moreover, while this description is made utilizing the layering of three such initial sheets 20, 22 and 24, it should be understood that the skilled artisan having reference to this description that any of a number of a plurality of such initial sheets may be layered one on top of another to produce the composite sheet 30 and that the organization of the layering can be in any selected pattern. Furthermore, each of the initial sheets, such as initial sheets 20, 22 and 24, are sheeted to a desired initial thickness and it is not necessary that these thicknesses be identical so that ultimately the production sheet 10 will have bands of different widths. In any event, composite sheet 30 has a composite thickness "$t_o$" which is the sum of the thicknesses of sheets 20, 22 and 24. Here, it is preferred that "$t_o$" be in the range of about one to six inches (2.5 to 15.0 cm). To increase the adherence of each of initial sheets 20, 22 and 24 together, they may be coated with a small amount of edible paste or, since they include a grain flour already, they may be sprayed with water to increase their natural tackiness. If composite sheet 30 has a thickness at the upper end of the range, it is often desirable to precompress it to a thickness of about two inches (5.0 cm).

Figure 3:
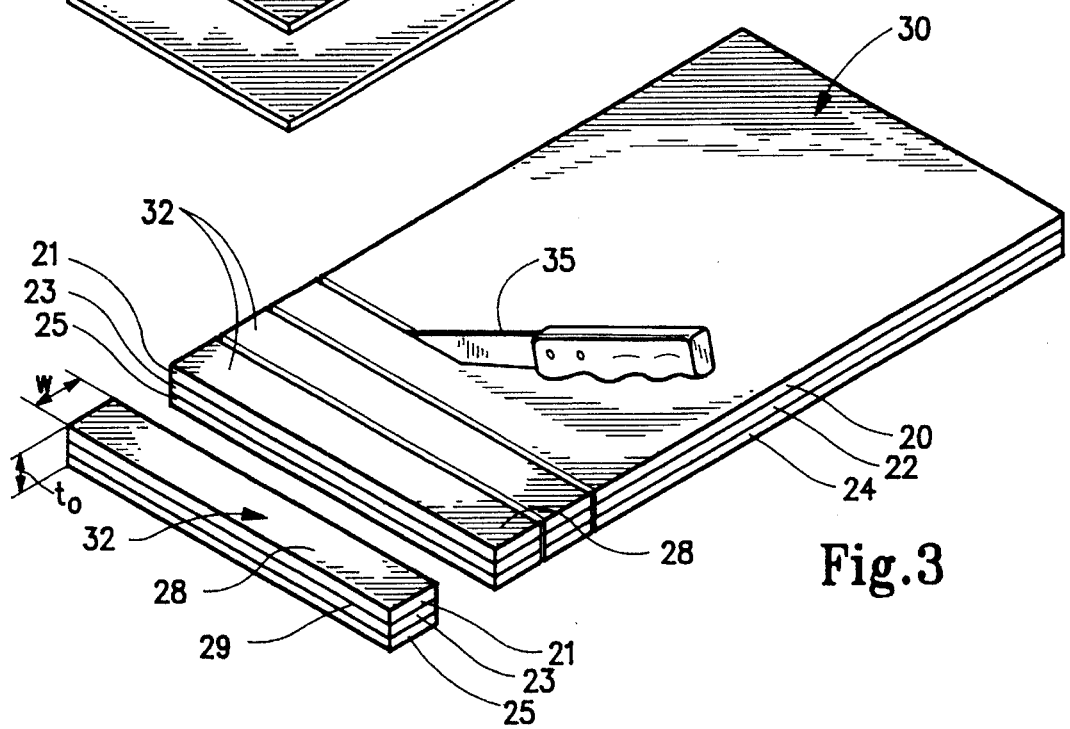
FIG. 3 is a perspective view illustrating the formation of elongated strips out of a composite sheet used to form the production sheet of FIG. 1.

After composite sheet 30 has been formed by layering the initial sheets 20, 22 and 24 on top of one another, it is cut into a plurality of elongated strips 32 each containing ribbon-like portions 21, 23 and 25 of the initial dough sheets 20, 22 and 24. As noted, just prior to cutting elongated strips 32, composite sheet 30 may be compressed to reduce its thickness and/or to increase the adherence of sheets 20, 22 and 24 together. Elongated strips 32 are cut to have a width "w" which is preferably in the range of approximately 0.125–2.0 inches (0.3–5.0 cm). Accordingly, each of the elongated strips have uncut surfaces 28 defined by the outer surfaces of the outermost ones of the ribbon-like portions 21, 23 and 25, and each multi-layered strip 32 has cut surfaces 29 extending between the uncut surfaces. Elongated strips 32 may be cut by hand, as is shown in FIG. 3 with reference to knife 35, but is should be understood that this could be more readily be automated in large scale production facilities. In any event, it is preferred to cut each of elongated strips 32 to have approximately the same width "w".

Figure 4:
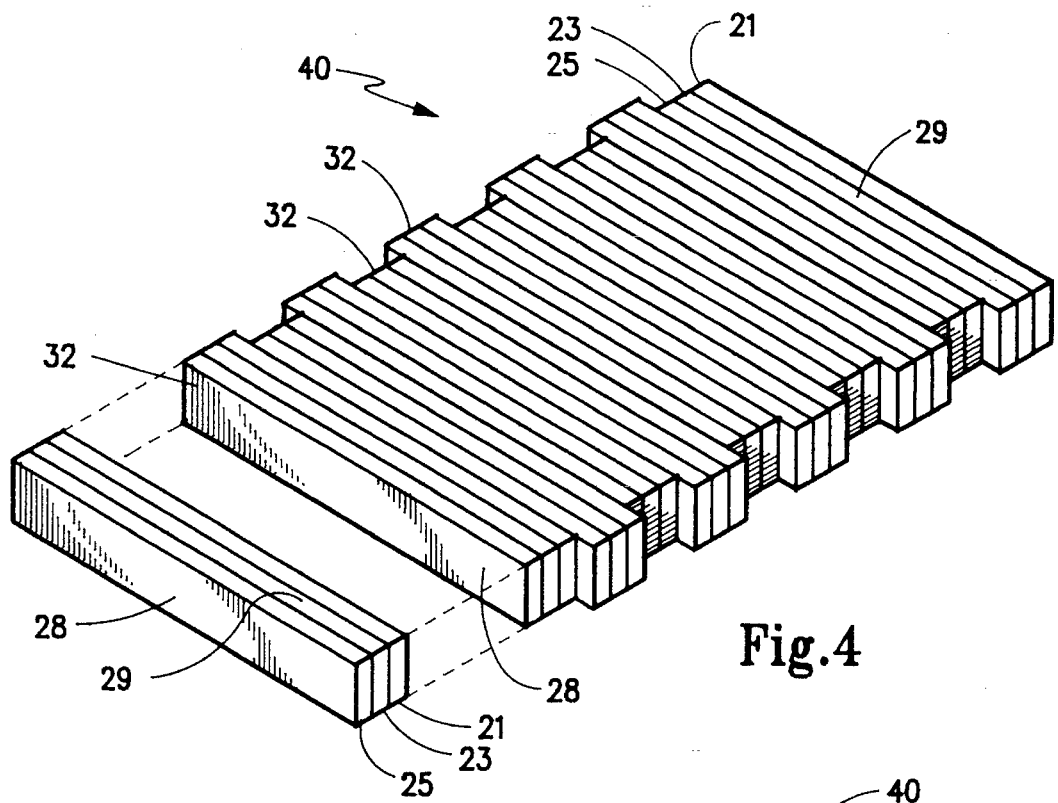
FIG. 4 is a perspective view illustrating the assembly of a plurality of elongated strips from FIG. 1 into an ensemble sheet used to produce the production sheet of FIG. 1.

A plurality of elongated strips 32 are now used to produce the ensemble sheet 40 shown in FIG. 4. Here, a plurality of elongated strips 32 are arranged by placing the uncut surfaces 28 of adjacent ones of the elongated strips 32 in intimate contact with one another such that the ribbon-like layers 21, 23 and 25 of the initial sheets extend between the top and bottom surfaces of the ensemble which result from the aligning of the uncut surfaces 28 at the top and bottom of the ensemble sheet 40. Accordingly, ensemble sheet 40 has an ensemble thickness that is equal to the width "w" of the elongated strips 32. To enhance the adherence of each of elongated strips 32, one to another, the uncut surfaces 28 may be coated with a paste material made of a suitable flour and water or other food adhesive, either before or after strips 32 are cut. As noted above, water alone may be used to increase tackiness and thus adhesion of the elongated strips.

Figure 5:
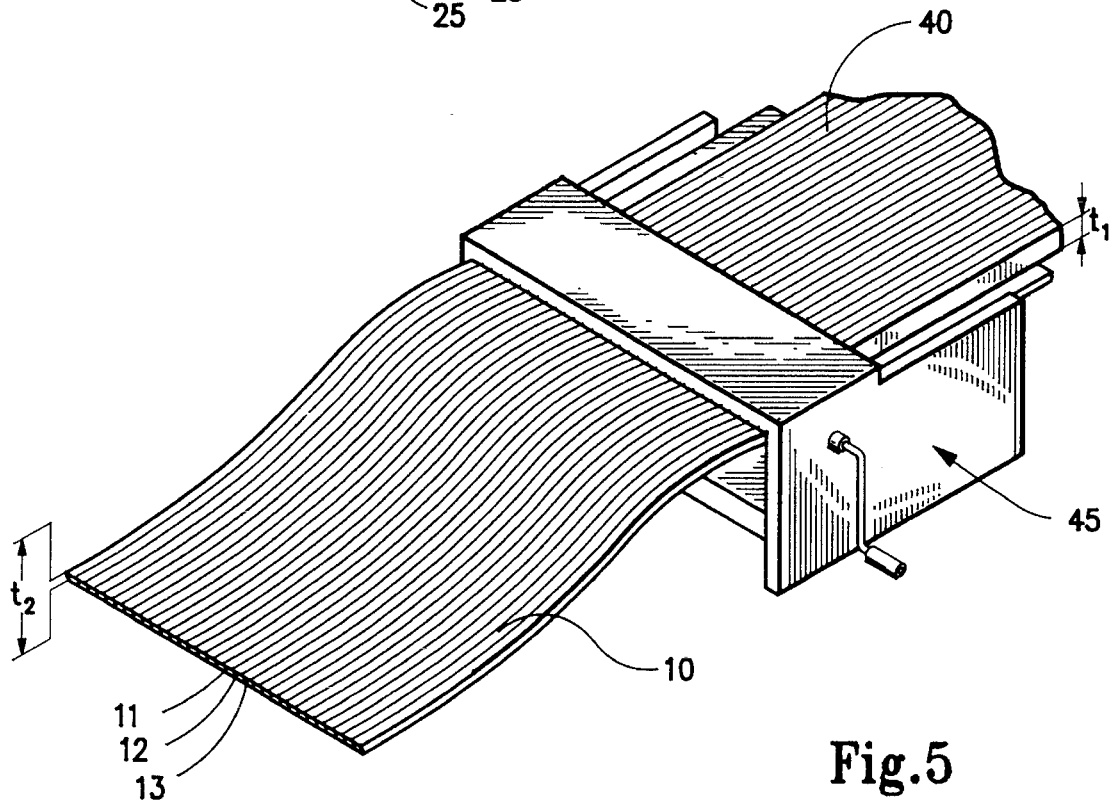
FIG. 5 is a perspective view, in diagrammatic form showing the sheeting of the ensemble sheet of FIG. 4 into the production sheet of FIG. 1.

Once ensemble sheet 40 is assembled, it is compressed into final production sheet 10, as shown in FIG. 5. Before this last compression, ensemble sheet 40 can optionally be compressed in the transverse direction to increase the bonding of elongated strips 32. In the last compression, though, the multi-banded ensemble sheet 40 is compressed in a conventional sheeting machine 45 from a first thickness "$t_1$" to a second thickness $t_2$ that is less than the first thickness in order to form the production sheet 10 having the three bands of dough 11, 12 and 13 each of which have a different composition from one another. Each band of dough 11, 12 and 13 extends longitudinally and completely through production sheet 10. As one of ordinary skill in the art should appreciate, the compressing of ensemble 32 can be of any conventional technique, such as roll forming, as is known in the art. Furthermore, as is shown in FIG. 5, bands 11, 12 and 13 have substantially the same width with each band extending uniformly through production sheet 10. However, if sheets 20, 22 and 24 were initially formed with different thicknesses so that the resulting layers 21, 23 and 25 were of different thickness, then the resulting width of bands 11, 12 and 13 could be varied to create different banded appearances.

After creating multi-banded production sheet 10 which, for purposes of description only, includes the three bands of dough having different compositions, production sheet 10 can be further processed by cutting it into an uncooked food product. Here again, for example only and not limitation, production sheet 10 may be cut into elongated strips, such as strips 42, shown in FIG. 6 to produce a noodle that itself has alternating bands of different composition 11, 12 and 13. However, as is shown in phantom, production sheet 10 can be cut into a variety of geometric shapes, including regular polygons, circles, crescents, semi-circles, and the like, and it would be even possible to cut production sheet 10 into animal shapes or other configurations. The resulting uncooked food product can then be sold to the consumer or further processed by the manufacturer into a cooked food product. For example, where production sheet 10 is used to produce a pasta, the resulting pasta noodles can be packaged in uncooked form. Alternatively, they could be cooked and packaged for reheating. Where production sheet 10 is to be used to produce snack chips, the production sheet 10 can be cut into the desired shape and the chips baked or fried as is known in the art.

It is also possible to produce a filled food product utilizing the production sheet 10 or a shape cut therefrom. A representative filled food product unit is described with respect to FIGS. 7 and 8, and a fabrication process for the simultaneous production of a plurality of filled food product units is described with respect to FIGS. 9–12. With reference, then, to FIGS. 7 and 8, it may be seen that a center-filled food product 50 is produced by utilizing a shell 52 formed of a first piece of dough 54 and a second piece of dough 56 which respectively have peripheral margins 55 and 57. Dough piece 54 is cut from production sheet 10 and, as is shown in FIGS. 7 and 8, is a semicircular portion of production sheet 10 so that it has a plurality of bands 61, 62 and 63. A filling 64 is placed between sheets 54 and 56 after which margins 55 and 57 are crimped about their periphery in order to form a joined edge to create shell 52 so that filling 64 is disposed within the interior of shell 52. Filling 64 may be selected from any suitable food filling, such as meat (including seafood), cheese, pudding, fruit preserves, jelly, jam, chocolate, etc., depending upon the type of final food product that is desired. For example, it is possible to produce the filled food product 50 as ravioli wherein a variety of different meat or cheese fillings may be employed. Alternatively, a toaster pastry can be formed with sheets 54 and 56 being a pastry dough and filling 64 being a fruit preserve, jelly or jam.

While filled food product 50 is created from pre-cut pieces of dough sheets, in larger scale manufacturing operations, it is usually more preferable to form a plurality of the filled food products concurrently. Accordingly, as is shown in FIG. 9, a representative unit 110 of toaster pastry may be produced concurrently with other units described with the illustrations shown in FIGS. 9–11. Here, it may be seen that toaster pastry 110 has a front multi-banded sheet 112 formed out of a production sheet 10 according to the present invention and a backing sheet 114 which may similarly be a production sheet according to the present invention or a plain pastry dough sheet. Multi-banded piece 112 is joined to plain piece 114 along confronting peripheral edges 116 to create an interior 118 (FIG. 12) into which filling 120 is disposed. Toaster pastry 110 may then be iced with a clear glazing 122. As is shown in FIGS. 9 and 10, sheet 112 of toaster pastry 110 has diagonally extending variegated bands 131, 132 and 133 of different composition which, for sake of explanation in accordance with the above description of production sheet 10, may be, for example only, chocolate, strawberry and vanilla flavored pastry doughs.

To produce a plurality of toaster pastry 110, a rectangular sheet of pastry dough 140 is cut from a production sheet 50 so that alternating bands 131, 132 and 133 of the vanilla, chocolate or strawberry flavorings alternate with one another and extend diagonally of sheet 140 as is shown in FIG. 10. Sheet 140 is superimposed on a plain sheet 142 of pastry dough onto which a matrix of discrete masses of a food filling 150 are placed. In FIG. 10, it may be seen that a matrix of three rows and four columns of food filling masses 150 are placed on sheet 142. With reference to FIGS. 11 and 12, it may be seen that, after placing food filling 150 on sheet 142, banded sheet 140 is compressed thereon so that the quantities of filling 150 are disposed between sheets 140 and 142 with sheets 140 and 142 being in contact within the regions between food filling masses 150. Sheets 140 and 142 are then joined around their perimeter 144 and across longitudinal joining lines 146 and transverse joining lines 148 such as by crimping or other techniques known in the art. This entire assembly 160 may then be cooked to bake the matrix of individual toaster pastries 110 after which they may be coated by a clear sugar glazing 122, as is shown in FIG. 12 and noted above. Thereafter, each individual toaster pastry 110 may be separated from matrix 160 and packaged in a conventional manner.

In lieu of placing the masses of food filling as a discrete matrix, many commercial applications dispense the food filing as a plurality of continuous longitudinal, parallel bands. Here, the bands are separated into the discrete units by the step of transverse crimping, for example, along joining lines 148. Yet, another commercial operation dispenses a single band of food filing over substantially the entire width of the sheet 142. Here, the discrete food filling masses are created by the longitudinal joining lines 146 as well as transverse joining lines 148. By referring to "discrete masses", the present invention encompasses all three of these techniques.

One possible automated implementation of the process according to the present invention is diagrammed in FIGS. 13(*a*), 13(*b*) and 13(*c*). With reference to FIG. 13(*a*), it may be seen that three initial sheets 220, 222 and 224 are respectively extruded from extruders 210, 212 and 214. Each of sheets 220, 222 and 224 may be approximately two inches (5.0 cm) in thickness and are layered with one another to produce a composite sheet 230. To facilitate adhesion of sheets 220, 222 and 224 together, a binding material, such as paste or water, may be dispensed on upper surfaces 223 (of sheet 222) and 225 (of sheet 224) by means of spray heads 216 and 218, respectively. Composite sheet 230 has a precompression step wherein its composite thickness is reduced by means of coacting rollers 232 and 234 prior to being cut by knife assembly 236 into elongated strips 241–248, shown in FIG. 13(*b*). Cutter 236 can be any conventional dough sheet cutter known in the art. The upper and lower surfaces 231 and 233 of composite sheet 230 may have a binding agent applied by spray heads 235 and 237 with this binding material again being paste or water.

With reference to FIG. 13(*b*), it may be seen that the elongated strips 241–248 which now have the binding material placed thereon, may be rotated 90° about their longitudinal axis, that is, turned onto their cut edge surfaces, by means of a plurality of rollers 250. Coacting rollers 252 and 254 act to move elongated strips 241–248 together as the ensemble strip 260. Coacting rollers 262, 264, 266 and 268 transversely compress ensemble sheet 260 to increase the adherence of elongated strips 241–248. Finally, sheeting roller 270 rolls ensemble sheet 260 into the final production sheet 280 for further processing.

Production sheet 280 may be further processed in any convenient manner but, with reference to FIG. 13(*c*) it may be seen that three dispensing heads 282, 284 and 286 respectively dispense bands 283, 285 and 287 of a food filling material onto production sheet 280. A second sheet 281 of dough material is then layered on top of production sheet 280 and bands 283, 285 and 287, and crimping roller 290 crimps the layered sheets 280, 281 into food units 300. To this end, crimping roller 290 has circumferential crimping blades 292 which serve to make longitudinal crimping lines 293; crimping roller 290 also has longitudinally extending crimping blades 294 which serve to make transverse crimping lines 295. Food units 300 are, for example, toaster pastries, raviolis, and the like which may be either packaged for sale in uncooked form or further cooked and packaged for consumer reheating.

Figure 13C:
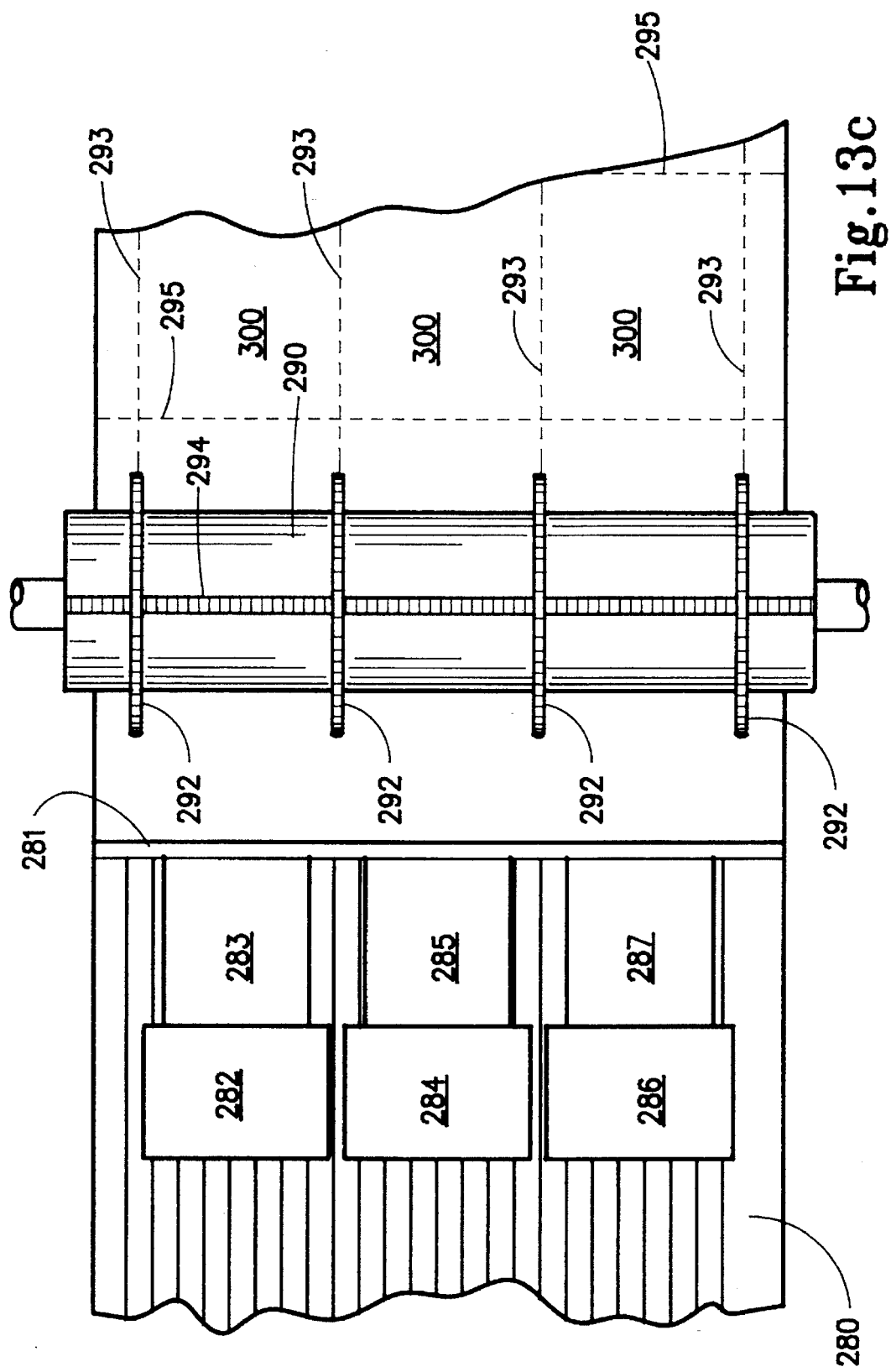

It should be clearly understood with reference to FIGS. 13(a)–13(c), that the fabrication process for food units 300 is merely for an example and is not for purposes of limitation. Thus, any type of traditional extrusion, rolling, sheeting or other food processing techniques for dough are to be deemed within the scope of this invention.

Accordingly, the present invention has been described with some degree of particularity directed to the exemplary embodiments of the present invention. It should be appreciated, though, that the present invention is defined by the following claims construed in light of the prior art so that modifications or changes may be made to the preferred embodiment of the present invention without departing from the inventive concepts contained herein.

I claim:

1. A process for making a production sheet of dough that may be used to produce a multi-banded product that has alternating bands with differing characteristics, comprising the steps of:

(a) forming each of a plurality of initial dough masses respectively into a plurality of initial dough sheets which each respectively has a selected initial thickness, wherein at least some of said dough masses have different characteristics and wherein said dough masses are of sufficient consistency to be formed into said initial dough sheets;

(b) layering said plurality of initial dough sheets, one on top of another, to form a composite sheet having a composite thickness which is the sum of the initial thicknesses of said plurality of initial dough sheets and which has outer opposite surfaces defined by exposed surfaces of outermost layers of said initial dough sheets;

(c) cutting said composite sheet into a plurality of elongated strips each having cut surfaces of a width equal to the composite thickness and uncut surfaces which are defined by a portion of the outer opposite surfaces of said composite sheet, each of said elongated strips thereby formed of ribbon-like portions of said initial sheets;

(d) arranging said plurality of elongated strips into an ensemble sheet wherein the uncut surfaces of adjacent elongated strips are in contact with one another such that the ribbon-like portions of each of the initial sheets extend between top and bottom surfaces of said ensemble sheet as defined by the cut surfaces of said elongated strips, said ensemble sheet having an ensemble sheet thickness between said top and bottom surfaces; and then (e) compressing said ensemble sheet by reducing the ensemble sheet thickness with said elongated strips joining with one another to form a production sheet, said production sheet thereby having a plurality of bands of dough extending therethrough with said bands having said different characteristics.

2. A process according to claim 1 wherein said characteristics are selected from the group consisting of: colorings, flavorings and compositions.

3. A process according to claim 2 wherein said flavorings are selected from the flavoring group consisting of sweeteners, vegetable flavorings and spices.

4. A process according to claim 1 wherein said dough masses are made from a flour selected from the group consisting of: wheat flour, corn flour, oat flour, rye flour, rice flour, vegetable flour and legume flour.

5. A process according to claim 1 wherein some of said initial dough sheets are formed with different initial thicknesses whereby some of said bands in said production sheet have different widths.

6. A process according to claim 1 wherein the step of forming said initial sheets and the step of forming said production sheet are accomplished by roll forming said initial dough masses and said ensemble sheet, respectively.

7. A process according to claim 1 wherein the initial thickness is approximately 0.125" to 2.0" (0.3 cm to 5.0 cm).

8. A process according to claim 1 wherein said elongated strips are cut with strip widths of approximately 0.5 inches as measured transversely along an uncut surface so that the resulting ensemble sheet thickness is approximately 0.5 inches.

9. A process according to claim 1 including the step of coating the uncut surfaces of said elongated strips with a material to increase adherence and joining of the uncut surfaces of adjacent elongated strips when arranged in said ensemble sheet and compressed to form said production sheet.

10. A process according to claim 1 wherein said elongated strips, when arranged in said ensemble sheet, are organized so that each of the bands in said production sheet has a different characteristic from each of its adjacent bands.

11. A process according to claim 1 including the step of cutting said production sheet into an uncooked food piece having a selected final shape.

12. A process according to claim 11 wherein said final shape is selected from the group consisting of: round, oval, triangular, rectangular and animal.

13. A process according to claim 11 including the step of cooking said uncooked food piece into a cooked food product.

14. A process according to claim 11 including the step of forming an enclosure having a pair of opposite side panels joined along their periphery to define an interior wherein at least one of said side panels is formed from said production sheet, and including the step of filling the interior with a food filling.

15. A process according to claim 14 wherein said food filling is selected from the group consisting of: meat, pudding, fruit preserves, jelly, jam, chocolate and cheese.

16. A process according to claim 1 including the step of applying a binding material to surfaces of at least some of said initial sheets to increase adherence of said initial sheets into said composite sheet.

17. A process according to claim 1 including the step of compressing said composite sheet to reduce said composite thickness prior to cutting said composite sheet into said elongated strips.

18. A process according to claim 1 including the step of compressing said ensemble sheet transversely prior to the step of compressing said ensemble sheet to reduce the ensemble sheet thickness.

19. A process for making a filled food product which has a first sheet of dough that is multi-banded with layers of differing characteristics, a second sheet of dough joined to said first sheet to define an enclosed interior and a food filling located in the interior, comprising the steps of:

(a) forming each of a plurality of initial dough masses respectively into a plurality of initial dough sheets which each respectively has a selected initial thickness, wherein at least some of said dough masses have different characteristics and wherein said dough masses are of sufficient consistency to be formed into said initial dough sheets;

(b) layering said plurality of initial dough sheets, one on top of another, to form a composite sheet having a composite thickness which is the sum of the initial thicknesses of said plurality of initial dough sheets and which has outer opposite surfaces defined by exposed surfaces of outermost layers of said initial dough sheets;

(c) cutting said composite sheet into a plurality of elongated strips each having cut surfaces of a width equal to the composite thickness and uncut surfaces which are defined by a portion of the outer opposite surfaces of said composite sheet, each of said elongated strips thereby formed of ribbon-like portions of said initial sheets;

(d) arranging said plurality of elongated strips into an ensemble sheet wherein the uncut surfaces of adjacent elongated strips are in contact with one another such that the ribbon-like portions of each of the initial sheets extend between top and bottom surfaces of said ensemble sheet as defined by the cut surfaces of said elongated strips, said ensemble sheet having an ensemble sheet thickness between said top and bottom surfaces;

(e) compressing said ensemble sheet by reducing the ensemble sheet thickness with said elongated strips becoming joined to one another to form a first production sheet, said first production sheet thereby having a plurality of bands of dough extending therethrough with said bands having said different characteristics;

(f) providing a second production sheet of dough;

(g) placing a selected quantity of food filling as a food filling mass on a medial portion of one of said first and second production sheets and superimposing the other of said first and second production sheets on the said one of said first and second production sheets; and then (h) joining a peripheral portion of said first and second production sheets to enclose said food filling mass to form a filled food unit.

20. A process according to claim 19 wherein said characteristics are selected from the group consisting of: colorings, flavorings and compositions.

21. A process according to claim 20 wherein said flavorings are selected from the flavoring group consisting of sweeteners, vegetable flavorings and spices.

22. A process according to claim 19 wherein said dough masses are made from a flour selected from the group consisting of: wheat flour, corn flour, oat flour, rye flour, rice flour, vegetable four and legume flour.

23. A process according to claim 19 including the step of coating the uncut surfaces of said elongated strips with a paste material to increase adherence of the uncut surfaces of adjacent elongated strips when arranged in said ensemble sheet and compressed to form said first production sheet.

24. A process according to claim 19 including the step of cooking the joined first and second sheet with the food filling enclosed therein to form a cooked food product.

25. A process according to claim 19 wherein said food filling is selected from the group consisting of: meat, pudding, fruit preserves, jelly, jam, chocolate and cheese.

26. A process according to claim 19 wherein said food filling is placed on said one of said first and second production sheets to form a matrix of discrete filling masses, the step of joining a peripheral portion of said first and second production sheets includes the step of joining said first and second production sheets along joint lines located to separate said discrete food filling masses whereby each of said food filling masses is enclosed to produce a plurality of filled food units.

27. A process according to claim 26 including the step of separating said plurality of filled food units.

28. A process according to claim 27 including the step of cooking said plurality of filled food units.

29. A process according to claim 19 including the step of layering said first production sheet of said filled food unit with a clear frosting glaze whereby said bands of different characteristics may be viewed therethrough.

\* \* \* \* \*